(12) United States Patent
Cloward

(10) Patent No.: US 8,001,138 B2
(45) Date of Patent: Aug. 16, 2011

(54) WORD RELATIONSHIP DRIVEN SEARCH

(75) Inventor: Thomas E. Cloward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/786,310

(22) Filed: Apr. 11, 2007

(65) Prior Publication Data

US 2008/0256055 A1   Oct. 16, 2008

(51) Int. Cl.
 *G06F 17/30* (2006.01)
(52) U.S. Cl. .............. 707/765; 707/766; 707/E17.108
(58) Field of Classification Search .................. None
See application file for complete search history.

(56) References Cited

U.S. PATENT DOCUMENTS

| | | | |
|---|---|---|---|
| 5,694,592 A | 12/1997 | Driscoll | |
| 5,794,050 A * | 8/1998 | Dahlgren et al. | 717/144 |
| 5,826,261 A | 10/1998 | Spencer | |
| 5,933,822 A * | 8/1999 | Braden-Harder et al. | 1/1 |
| 6,138,085 A | 10/2000 | Richardson et al. | |
| 6,236,987 B1 * | 5/2001 | Horowitz et al. | 707/3 |
| 6,360,215 B1 | 3/2002 | Judd et al. | |
| 6,457,004 B1 | 9/2002 | Nishioka et al. | |
| 6,493,703 B1 * | 12/2002 | Knight et al. | 707/3 |
| 6,523,021 B1 * | 2/2003 | Monberg et al. | 1/1 |
| 6,643,641 B1 | 11/2003 | Snyder | |
| 6,785,671 B1 * | 8/2004 | Bailey et al. | 1/1 |
| 6,842,730 B1 | 1/2005 | Ejerhed et al. | |
| 7,120,574 B2 | 10/2006 | Troyanova et al. | |
| 2004/0181520 A1 | 9/2004 | Imaichi et al. | |
| 2007/0150348 A1 * | 6/2007 | Hussain et al. | 705/14 |
| 2007/0226195 A1 * | 9/2007 | Huck | 707/3 |
| 2007/0250500 A1 * | 10/2007 | Ismalon | 707/5 |
| 2007/0282785 A1 * | 12/2007 | Fayyad et al. | 707/1 |
| 2008/0201368 A1 * | 8/2008 | Lee et al. | 707/104.1 |

OTHER PUBLICATIONS

Chen, et al., "Building a Web Thesaurus from Web Link Structure", Date: 2005, http://research.microsoft.com/~zhengc/papers/p14325-chen.pdf.

Manber, et al., "The Search Broker", Date: 2003, http://www.usenix.org/publications/library/proceedings/usits97/full_papers/manber_search/manber_search.html.

Krikos, et al., "DirectoryRank: Ordering Pages in Web Directories", Date: 2005, pp. 17-22, http://delivery.acm.org/10.1145/1100000/1097052/p17-krikos.pdf? key1=1097052&key2=1592001711&coll=GUIDE&dl=GUIDE&CFID=13943815&CFTOKEN=26003480.

* cited by examiner

*Primary Examiner* — Shyue Jiunn Hwa

(57) ABSTRACT

Various technologies and techniques are disclosed for performing searches based upon word relationships. A search term is received from a user in the form of at least one primary word. A data store is searched to determine if the primary word is associated with any content. If so, at least one reference to primary content that has been pre-defined as being related to the primary word is included in the search result. At least one reference to secondary content is included in the search result, if secondary content is found. Secondary contents are those that contain words that have been pre-defined as being related to the primary word. The search results are displayed to the user, with the primary references displayed along with the secondary references, if applicable, in a hierarchical fashion.

12 Claims, 7 Drawing Sheets

WORD RELATIONSHIP DRIVEN SEARCH

BACKGROUND

In today's world of technology, information is available more than ever before. Computers all around the world typically have several gigabytes of storage, and are connected together over networks such as the Internet. For example, the Internet contains trillions of pages of valuable information that can be accessed by end users. The most popular technique for accessing this information today is using key word searches in search engines such as google.com or yahoo.com. The problem with key word searches is that you may often get numerous, maybe even hundreds or thousands, of hits for the same term. Key word searches do not discriminate on how relevant a given term actually is within the particular content that was indexed. Rather, key word searches merely show you that a given content "contained" that word somewhere in the document.

While this key word searching approach is great for finding any document that contains that word anywhere within its text, it is not very helpful when you really only want to find the references that use a particular term as a key concept. Users are left with filtering through dozens if not hundreds of results, sometimes finding that some of the more relevant documents are very far down in the search results list. This is both time consuming and frustrating for the user seeking specific information at a particular moment.

SUMMARY

Various technologies and techniques are disclosed for performing searches based upon word relationships. A search term is received from a user in the form of at least one primary word. A data store is searched to determine if the primary word is associated with any content. If so, at least one reference to primary content that has been pre-defined as being related to the primary word is included in the search result. At least one reference to secondary content is included in the search result, if secondary content is found. Secondary contents are those that contain words that have been pre-defined as being related to the primary word. The search results are displayed to the user, with the primary references displayed along with the secondary references, if applicable. In one implementation, the search results are displayed in a hierarchical fashion, with the primary references displayed along with the secondary references. In one implementation, the search result includes fewer results than a traditional key word search because one or more of the relationships are pre-defined for the primary word.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
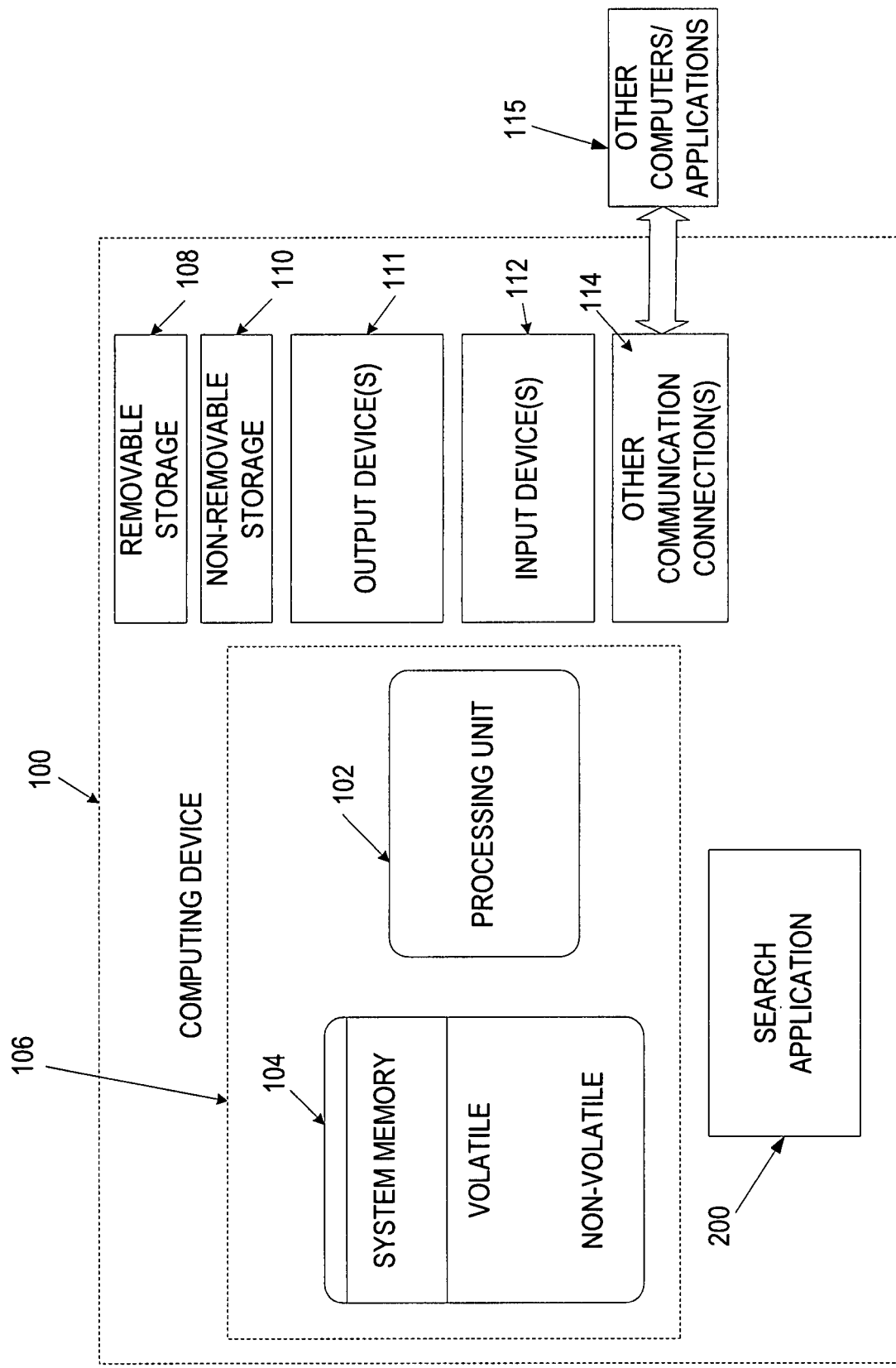
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows a user to perform searches for content, but the system also serves other purposes in addition to these. In one implementation, one or more of the techniques described herein can be implemented as features within a search engine, or from any other type of program or service that allows an end user to search for content related to a particular concept.

In one implementation, a searching system is provided that searches based upon primary words. A primary word is assigned by a content owner as being the most important concept (or a high priority concept) for a particular content (e.g. web page, document, etc.). The term primary word as used herein can include a word, or a phrase that contains multiple words. One or more secondary words can also be assigned by the content owner to the particular content. The primary word and secondary word(s) are retrieved by an indexer, such as a search engine, to build an index of the content. An end user can then perform a search based upon a search term. The system then accesses the index to see if any content has been pre-defined as a primary word matching that search term. If so, then secondary content is also retrieved, if any are present. The results for the primary content and the secondary content can be displayed to the user in the search results, such as in a hierarchical fashion. In one implementation, by searching using relationships between words, more relevant results can be returned for the user and organized in a more meaningful fashion. In one implementation, there can be just one primary word or phrase associated with a given piece of content. In another implementation, there can be more than one primary word or phrase associated with a given piece of content.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes search application 200. In one implementation, search application 200 can be accessed from a separate computing device operated by an end user using the search application, such as in a networked environment. In another implementation, search application is contained on a same computing device as the one used by and end user. In yet another implementation, search application 200 is performed on multiple computers. Numerous other computing device variations are also possible. Search application 200 will be described in further detail in FIG. 2.

Figure 2:
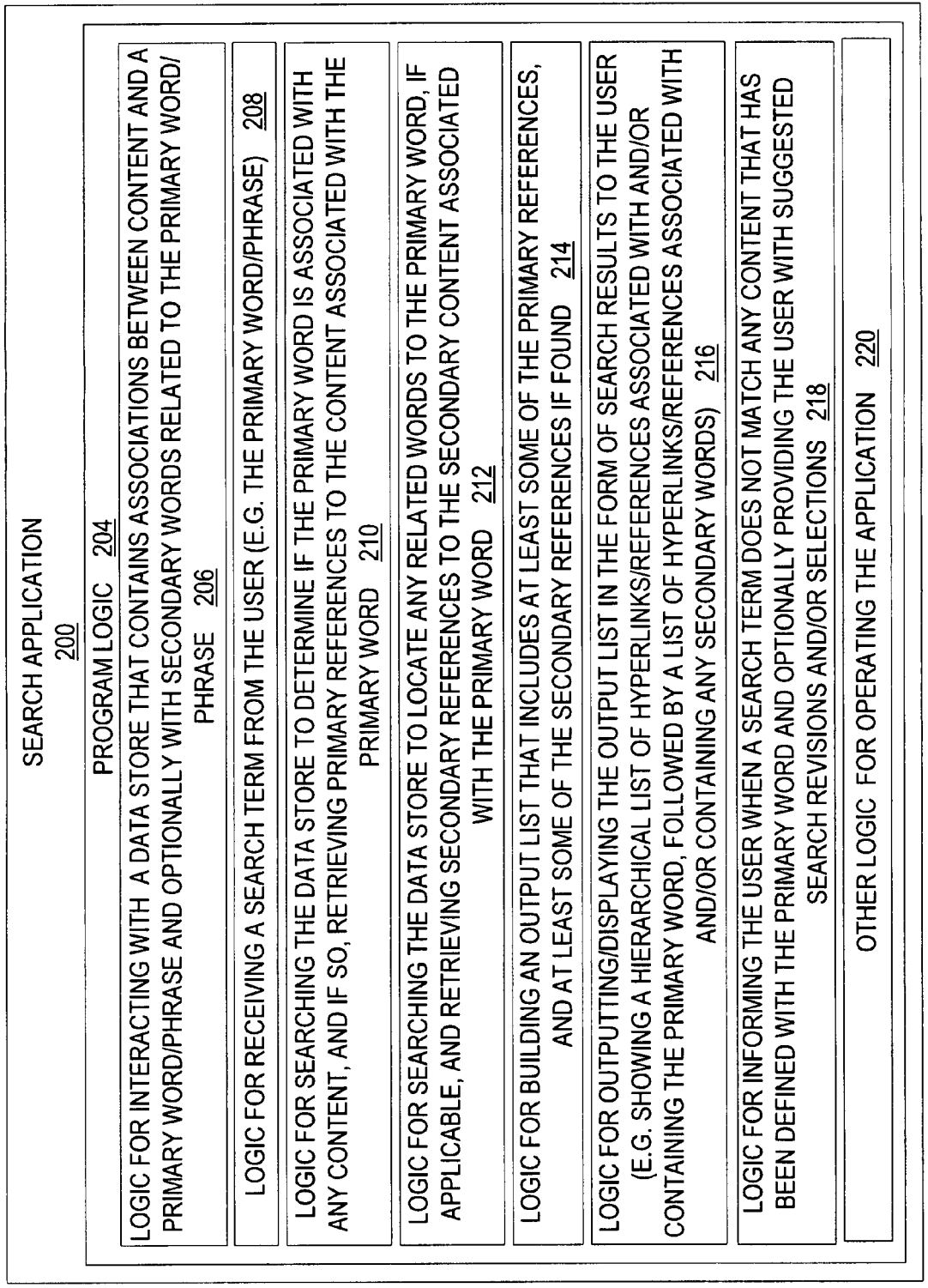
FIG. 2 is a diagrammatic view of search application of one implementation operating on the computer system of FIG. 1.

Turning now to FIG. 2 with continued reference to FIG. 1, a search application 200 operating on computing device 100 is illustrated. In one implementation, search application 200 is one of the application programs that reside on computing device 100. However, it will be understood that search application 200 can alternatively or additionally be embodied as computer-executable instructions on one or more computers and/or in different variations than shown on FIG. 1. Alternatively or additionally, one or more parts of search application 200 can be part of system memory 104, on other computers and/or applications 115, or other such variations as would occur to one in the computer software art.

Search application 200 includes program logic 204, which is responsible for carrying out some or all of the techniques described herein. Program logic 204 includes logic for interacting with a data store that contains associations between content and a primary word/phrase and optionally with secondary words related to the primary word/phrase 206; logic for receiving a search term from the user (e.g. the primary word/phrase) 208; logic for searching the data store to determine if the primary word is associated with any content, and if so, retrieving primary references to the content associated with the primary word 210; logic for searching the data store to locate any related words to the primary word, if applicable, and retrieving secondary references to the secondary content associated with the primary word 212; logic for building an output list that includes at least some of the primary references, and at least some of the secondary references if found 214; logic for outputting/displaying the output list in the form of search results to the user (e.g. showing a hierarchical list of hyperlinks/references associated with and/or containing the primary word, followed by a list of hyperlinks/references associated with and/or containing any secondary words) 216; logic for informing the user when a search term does not match any content that has been defined with the primary word and optionally providing the user with suggested search revisions and/or selections 218; and other logic for operating the application 220. In one implementation, program logic 204 is operable to be called programmatically from another program, such as using a single call to a procedure in program logic 204.

Figure 3:
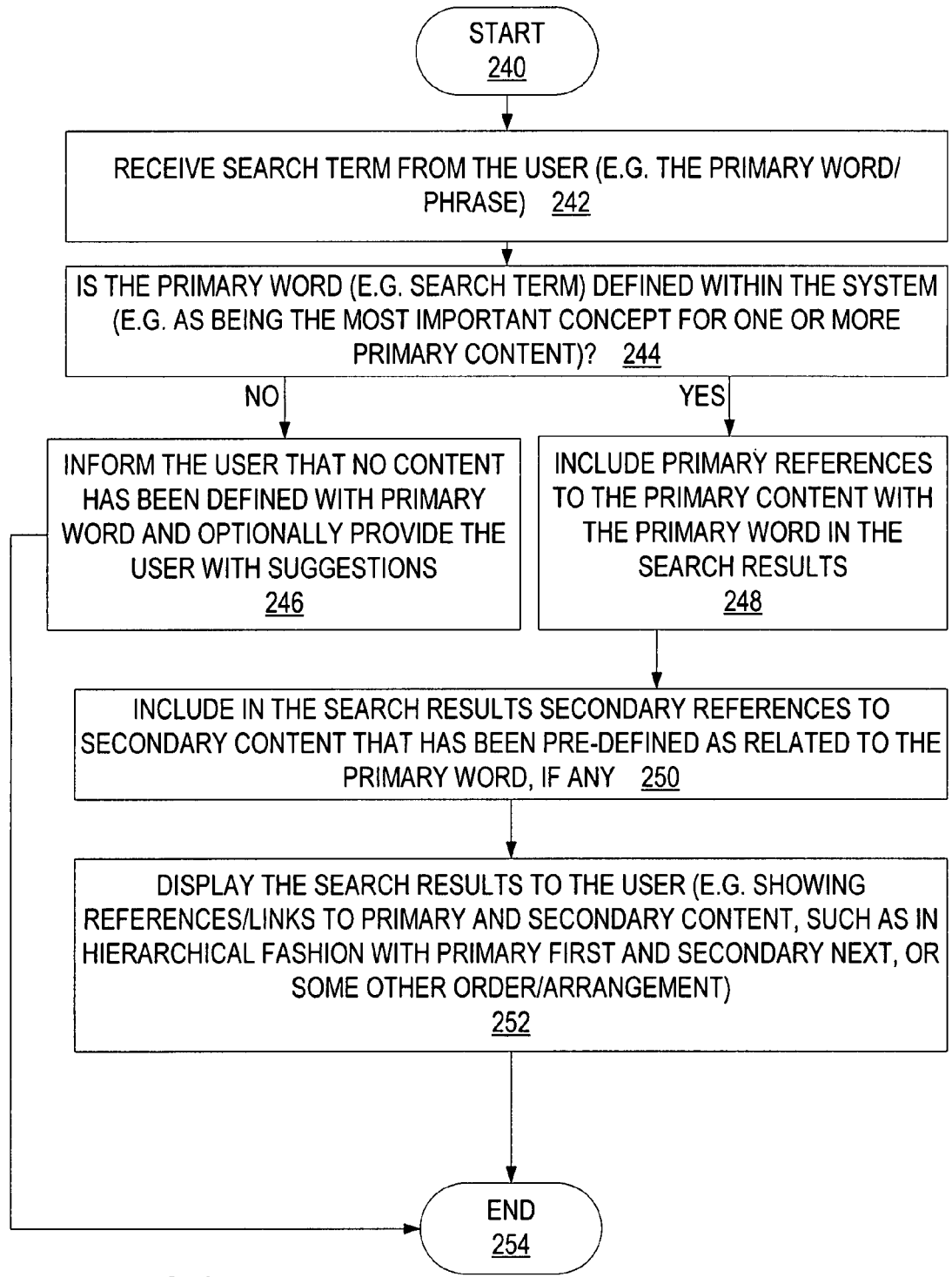
FIG. 3 is a high-level process flow diagram for one implementation of the system of FIG. 1.

Turning now to FIGS. 3-6 with continued reference to FIGS. 1-2, the stages for implementing one or more implementations of search application 200 are described in further detail. FIG. 3 is a high level process flow diagram for the search application 200. In one form, the process of FIG. 3 is at least partially implemented in the operating logic of computing device 100. The process begins at start point 240 with receiving a search term from the user (e.g. the primary word/phrase) (stage 242). The system determines if the primary word (e.g. search term) is defined (e.g. as being the most important concept for one or more primary content) (decision point 244). If the primary word is not defined in the system (decision point 244), then the user is informed of this and optionally provided with suggestions on other words to use that are available (stage 246). In one implementation, the suggestions are for other words that are available that are in the same field as the one entered. In another implementation, the suggestions are for a correct way to spell a term that the user entered incorrectly. Alternatively or additionally, these suggestions can be pre-defined along with the primary and secondary words.

If the primary word is defined in the system (decision point 244), the primary references to the primary content defined with the primary word are included in the search results (stage 248). Secondary references to secondary content that have been pre-defined as related to the primary word are also included in the search results, if there are any (stage 250). The search results are displayed to the user (stage 252). In one implementation, the search results show references/links to primary and secondary content, such as in hierarchical fashion with primary first and secondary next, or some other order/arrangement (stage 252). The term hierarchical list as used herein is meant to include a list that includes one or more levels of nesting of the search results. The process ends at end point 254.

Figure 4:
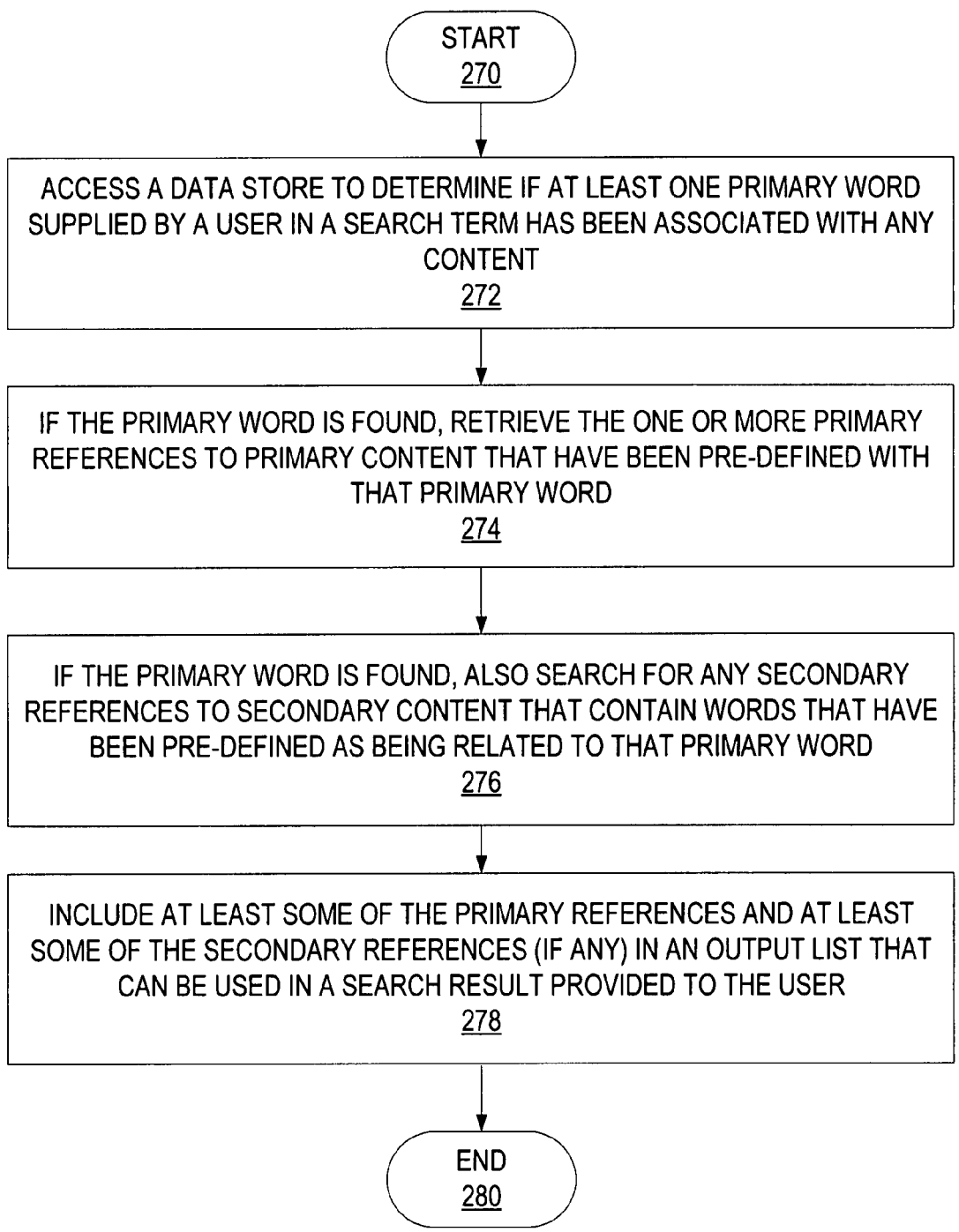
FIG. 4 is a process flow diagram for one implementation illustrating the stages involved in accessing a data store to locate primary references and secondary references to the primary word.

FIG. 4 illustrates one implementation of the stages involved in accessing a data store to locate primary references and secondary references to the primary word. In one form, the process of FIG. 4 is at least partially implemented in the operating logic of computing device 100. The process begins at start point 270 with accessing a data store to determine if at least one primary word supplied by a user in a search term has been associated with any content (stage 272). If the primary word is found, the system retrieves the one or more primary references to the primary content that have been pre-defined with that primary word (stage 274). If the primary word is found, the system also searches for any secondary references to secondary content that contain words that have been pre-defined as being related to that primary word (stage 276). At least some of the primary references and at least some of the secondary references (if any) are included in an output list that can be used in a search result provided to the user (stage 278). The process ends at end point 280.

Figure 5:
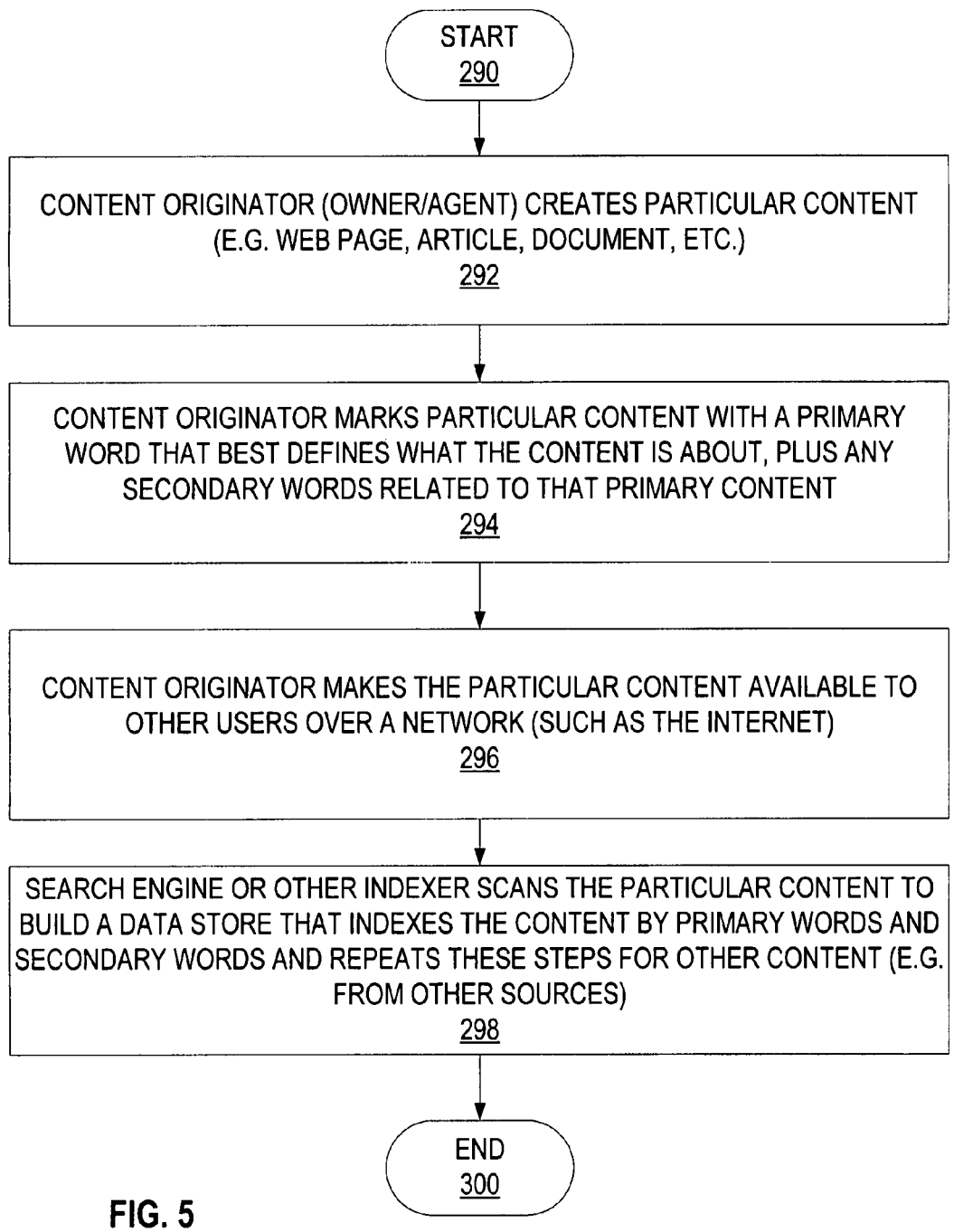
FIG. 5 is a process flow diagram for one implementation illustrating the stages involved in assigning primary words and secondary words to content that can be indexed by a search engine.

FIG. 5 illustrates one implementation of the stages involved in assigning primary words and secondary words to content that can be indexed by a search engine. In one form, the process of FIG. 5 is at least partially implemented in the operating logic of computing device 100. The process begins at start point 290 with the content originator (owner/agent) creating particular content (e.g. a web page, article, document, etc.) (stage 292). The content originator marks particular content with a primary word that best defines what the content is about, plus any secondary words related to that primary content (stage 294). The content originator makes the particular content available to other users over a network (such as the internet) (stage 296). In one implementation, the search engine or other indexer scans the particular content to build a data store that indexes the content by primary words and secondary words and repeats these steps for other content (e.g. from other sources) (stage 298). Various other techniques can be used for building the index, including inputting some or all of the records manually into the index. In one implementation, manual and/or programmatic entries could be made for the purpose of defining what type of content is allowed within a given search domain. For example, these entries could be used to specify content (e.g. within a company or beyond) that should be restricted based upon age, workplace environment, security authorization, and so on. The process ends at end point 300.

Figure 6:
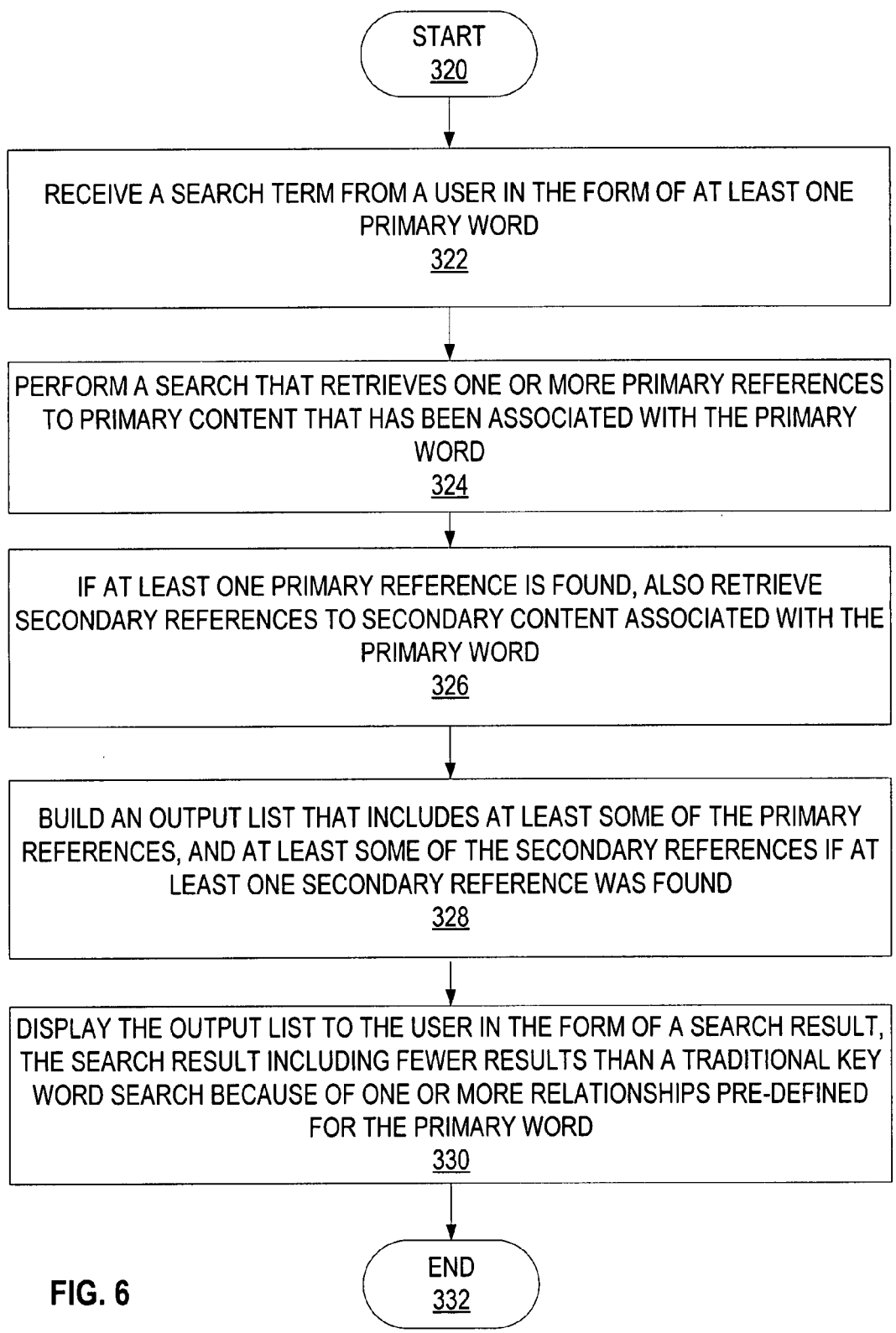
FIG. 6 is a process flow diagram for one implementation illustrating the stages involved in providing search results based upon relationships pre-defined for the primary word.

FIG. 6 illustrates one implementation of the stages involved in providing search results based upon relationships pre-defined for the primary word. In one form, the process of FIG. 6 is at least partially implemented in the operating logic of computing device 100. The process begins at start point 320 with receiving a search term from a user in the form of at least one primary word (stage 322). The system performs a search that retrieves one or more primary references to primary content that has been associated with the primary word (stage 324). If at least one primary reference is found, the system also retrieves secondary references to secondary content associated with the primary word, if there are any (stage 326). An output list is built that includes at least some of the primary references, and at least some of the secondary references if at least one secondary reference was found (stage 328). The system displays the output list to the user in the form of a search result (such as the hierarchical search result shown in FIG. 7), with the search result including fewer results than a traditional key word search because of one or more relationships that have been pre-defined for the primary word (stage 330). The process ends at end point 332.

In one implementation, some or all of the word relationship driven searching techniques described herein can be used instead of key word searches, or in addition to key word searches. In other words, one implementation of the system can allow a user to choose whether to perform a relationship driven search or a key word search. In another implementation, a key word search can be performed when there have not been a sufficient number of results returned by the word relationship driven search. Numerous other combinations of searches can also be provided in alternate implementations.

Figure 7:
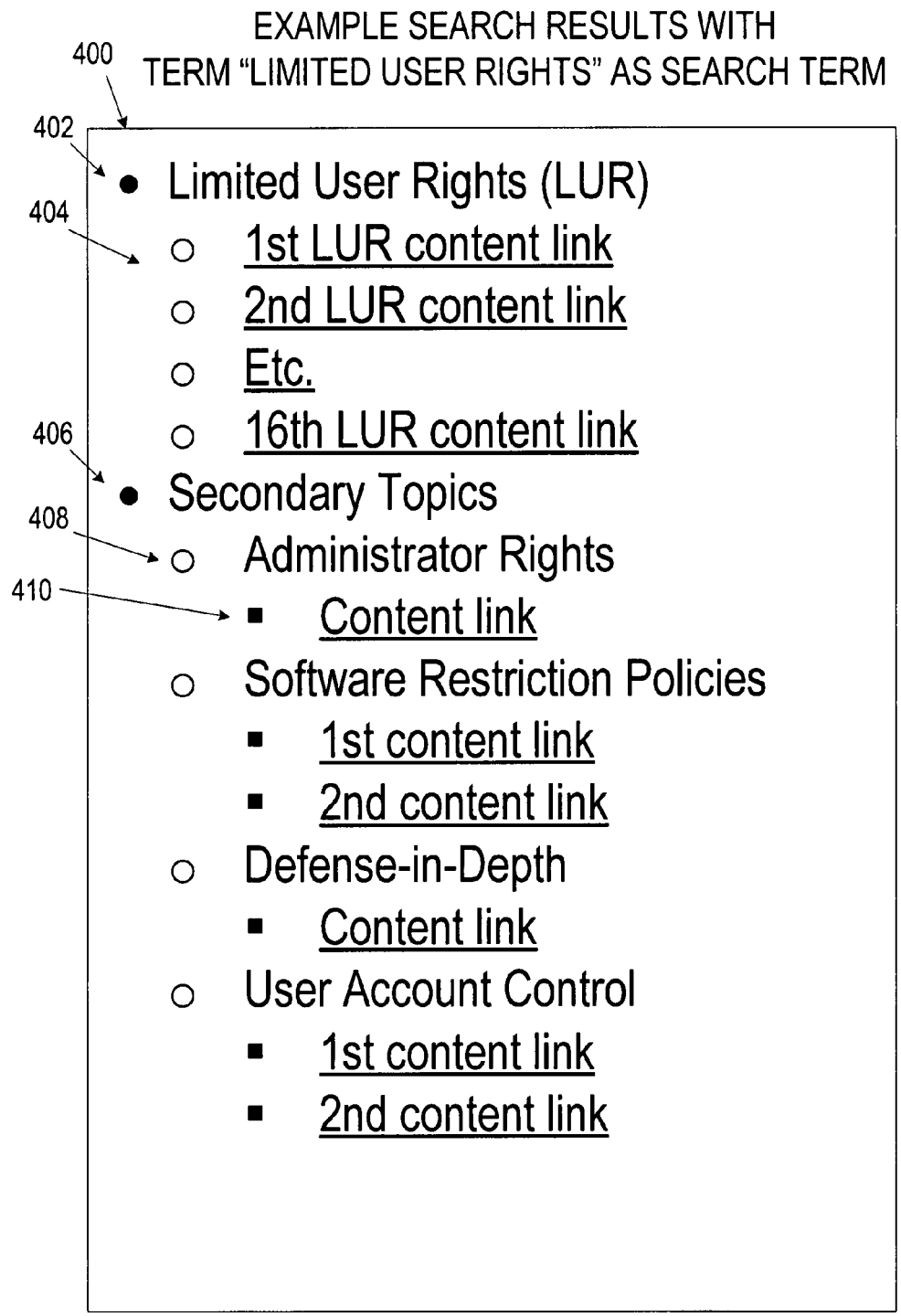
FIG. 7 is a simulated screen for one implementation that illustrates a search result that contains primary references and secondary references in a hierarchical fashion.

FIG. 7 is a simulated screen 400 for one implementation that illustrates a search result that contains primary references and secondary references in a hierarchical fashion. In the non-limiting example shown in FIG. 7, the search results 400 contain primary references 404 that were found for the primary word 402, which in this example was the search term "limited user rights" entered by the user. The primary references 404 are shown as hyperlinks to content that were pre-defined with "limited user rights" as the primary word for that content. In other implementations, some or all of the actual contents can be displayed instead of or in addition to the hyperlinks. Secondary topics 406 are also displayed in the hierarchy and organized by each of the different related words and their respective one or more references (e.g. hyperlinks). For example, the related term Administrator Rights 406 is listed in the hierarchy, with the reference to its content 410 beneath. Secondary references to content that are associated with and/or contain each term that was pre-defined as being related to the primary word are shown in this hierarchical fashion. The user can select a given reference (e.g. hyperlink) to access the detailed content behind that reference. In one implementation, the user is redirected to a web page that contains the content. In another implementation, a document is opened for the user to view. Numerous other variations are also possible that display the underlying content to the user. In one implementation, the hierarchical list can be collapsed and expanded to allow a user to see different views of the information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing a word relationship driven search comprising the steps of:

receiving a search term from a user;

determining in a computer system if the search term was previously assigned to particular content as a primary word by an originator of the content;

if the search term is determined to have been previously assigned to particular content as the primary word by the originator of the content, including in a search result at least one primary reference to primary content that has been pre-defined as being related to the primary word, determining a secondary word predefined as related to the primary word, including in the search result at least one secondary reference to secondary content, the secondary reference containing the secondary word, the search result being generated by accessing a data store to find the at least one primary reference and the at least one secondary reference, the data store being an index of content from a plurality of sources, and displaying the search result to the user, with the at least one primary reference displayed along with the at least one secondary reference, the search results being displayed in a hierarchy such that the at least one primary reference is shown in a primary reference portion of the hierarchy and the at least one secondary reference is shown in a secondary reference portion of the hierarchy, and the at least one primary reference and the at least one secondary reference being displayed in the form of hyperlinks; and if the search term is determined to not have been previously assigned to particular content as the primary word by the originator of the content, informing the user that the search term has not been previously assigned to particular content as the primary word, and providing the user with one or more suggestions of other words in a same field as the search term.

2. The method of claim 1, wherein the search result contains the at least one reference to primary content that has been pre-defined as having the primary word as a most important concept for the primary content.

3. The method of claim 1, wherein the at least one primary reference is displayed first, followed by the at least one secondary reference.

4. The method of claim 1, wherein the data store has been generated by a search engine.

5. The method of claim 1, wherein a particular one of the hyperlinks can be selected to access content associated with the particular hyperlink.

6. The method of claim 1, wherein the primary word is pre-defined by an originator of the primary content.

7. A non-transitory computer-readable medium having computer-executable instructions for causing a computer to perform steps comprising:

receive a search term from a user;

search a data store and determine if the search term was previously assigned to particular content as a primary word by an originator of the content, the data store being an index of content from a plurality of sources;

if the search term is determined to be previously assigned to particular content as the primary word, then retrieve from the data store one or more primary references to primary content that has been associated with the primary word;

if at least one primary reference is found, determine a secondary word predefined as related to the primary word;

search the data store and retrieve secondary references to secondary content associated with the secondary word, if any exist;

build an output list that includes at least some of the primary references, and at least some of the secondary references if at least one secondary reference was found; and display the output list to the user in the form of a search result, the output list being displayed in a hierarchy such that the one or more primary references are shown in a primary reference portion of the hierarchy and the secondary references are shown in a secondary reference portion of the hierarchy, and the one or more primary references and the secondary references being displayed in the form of hyperlinks; and if the search term is determined to not have been previously assigned to particular content as the primary word, informing the user that the search term has not been previously assigned to particular content as the primary word, and providing the user with one or more suggestions of other words in a same field as the search term.

8. The non-transitory computer-readable medium of claim 7, wherein the data store is operable to store associations between content and respective primary words along with associations to secondary content that are related to the primary words.

9. The non-transitory computer-readable medium of claim 7, wherein the output list contains at least some of the primary references first, followed by at least some of the secondary references.

10. The non-transitory computer-readable medium of claim 7, wherein a particular one of the hyperlinks can be selected to access a particular primary content associated with the particular one of the hyperlinks.

11. The non-transitory computer-readable medium of claim 7, wherein the user is notified if the primary word is determined to not be associated with any content.

12. A method for performing a word relationship driven search comprising the steps of:

receiving a search term from a user;

determining in a computer system if the search term was previously assigned to particular content as a primary word by an originator of the content;

if the search term is determined to have been previously assigned to particular content as the primary word by the originator of the content, performing a search that retrieves one or more primary references to primary content that has been associated with the primary word by the primary content having been pre-defined as being related to the primary word, if at least one primary reference is found, determining a secondary word predefined as related to the primary word, retrieving secondary references to secondary content associated with the secondary word, if any, building an output list that includes at least some of the primary references, and at least some of the secondary references if at least one secondary reference was found, and displaying the output list to the user in the form of a search result, the search result including fewer results than a traditional key word search because of one or more relationships pre-defined for the primary word, the output list being displayed in a hierarchy such that the one or more primary references are shown in a primary reference portion of the hierarchy and the secondary references are shown in a secondary reference portion of the hierarchy, the search result being generated by accessing a data store to find the one or more primary references and the secondary references, the data store being an index of content from a plurality of sources, and the one or more primary references and the secondary references being displayed in the form of hyperlinks; and if the search term is determined to not have been previously assigned to particular content as the primary word, informing the user that the search term has not been previously assigned to particular content as the primary word, and providing the user with one or more suggestions of other words in a same field as the search term.

* * * * *